United States Patent [19]

Chang et al.

[11] Patent Number: 4,788,378

[45] Date of Patent: Nov. 29, 1988

[54] DEWAXING BY ISOMERIZATION

[75] Inventors: Clarence D. Chang, Princeton; David S. Shihabi, Pennington, both of N.J.; Paul B. Weisz, Yardley, Pa.

[73] Assignee: Mobil Oil Corporation, New York, N.Y.

[21] Appl. No.: 82,396

[22] Filed: Aug. 6, 1987

Related U.S. Application Data

[63] Continuation-in-part of Ser. No. 864,746, May 13, 1986, Pat. No. 4,701,313, which is a continuation of Ser. No. 683,768, Dec. 19, 1984, abandoned.

[51] Int. Cl.$^4$ .............................................. C07C 5/13
[52] U.S. Cl. ..................................... 585/739; 585/747; 585/740; 585/742; 208/120; 208/27; 208/135; 208/115; 423/277; 423/326; 423/328; 423/329; 502/77; 502/85; 502/202
[58] Field of Search ............... 208/111, 115, 114, 116, 208/120; 585/740, 747, 739; 423/277, 326, 328, 329; 502/77, 85, 202

[56] References Cited

U.S. PATENT DOCUMENTS

| Re. 28,341 | 2/1975 | Wadlinger | 208/120 |
|---|---|---|---|
| Re. 29,948 | 3/1979 | Dwyer et al. | 502/62 |
| 3,308,069 | 3/1957 | Wadlinger et al. | 502/62 |
| 3,923,641 | 12/1975 | Morrison | 208/111 |
| 4,268,420 | 5/1981 | Klotz | 208/111 |
| 4,327,236 | 4/1982 | Klotz | 208/111 |
| 4,419,220 | 12/1983 | LaPierre et al. | 208/111 |
| 4,435,275 | 3/1984 | Derr et al. | 208/89 |
| 4,481,104 | 11/1984 | Walsh | 208/120 |
| 4,486,296 | 12/1984 | Oleck et al. | 208/111 |
| 4,501,926 | 2/1985 | LaPierre et al. | 585/739 |
| 4,518,485 | 5/1985 | LaPierre et al. | 208/89 |
| 4,530,756 | 7/1985 | Chang et al. | 208/111 |
| 4,541,919 | 9/1985 | LaPierre et al. | 208/111 |
| 4,554,065 | 11/1985 | Albinson et al. | 208/59 |
| 4,568,655 | 2/1986 | Oleck et al. | 208/111 |
| 4,569,833 | 2/1986 | Gortsena et al. | 208/119 |
| 4,599,162 | 7/1986 | Yen | 208/120 |
| 4,612,108 | 9/1986 | Angevine et al. | 208/97 |
| 4,624,774 | 11/1986 | Chang et al. | 423/305 |
| 4,658,075 | 4/1987 | Dessau et al. | 423/328 |
| 4,701,131 | 10/1987 | Chang et al. | 585/481 |

FOREIGN PATENT DOCUMENTS 0094827  11/1983  European Pat. Off. ............ 208/111

Primary Examiner—H. M. S. Sneed
Assistant Examiner—Helane Myers
Attorney, Agent, or Firm—Alexander J. McKillop; Michael G. Gilman; Dennis P. Santini

[57] ABSTRACT

A process is provided for dewaxing hydrocarbon feedstock by isomerizing the waxy components of the feedstock over catalyst comprising a siliceous zeolite having been prepared by the method comprising providing a boron-containing zeolite Beta, treating the zeolite with silicon tetrachloride at a temperature and for a time sufficient to replace boron with silicon, and recovering the siliceous zeolite having reduced boron content but substantially preserved initial aluminum content.

14 Claims, 1 Drawing Sheet

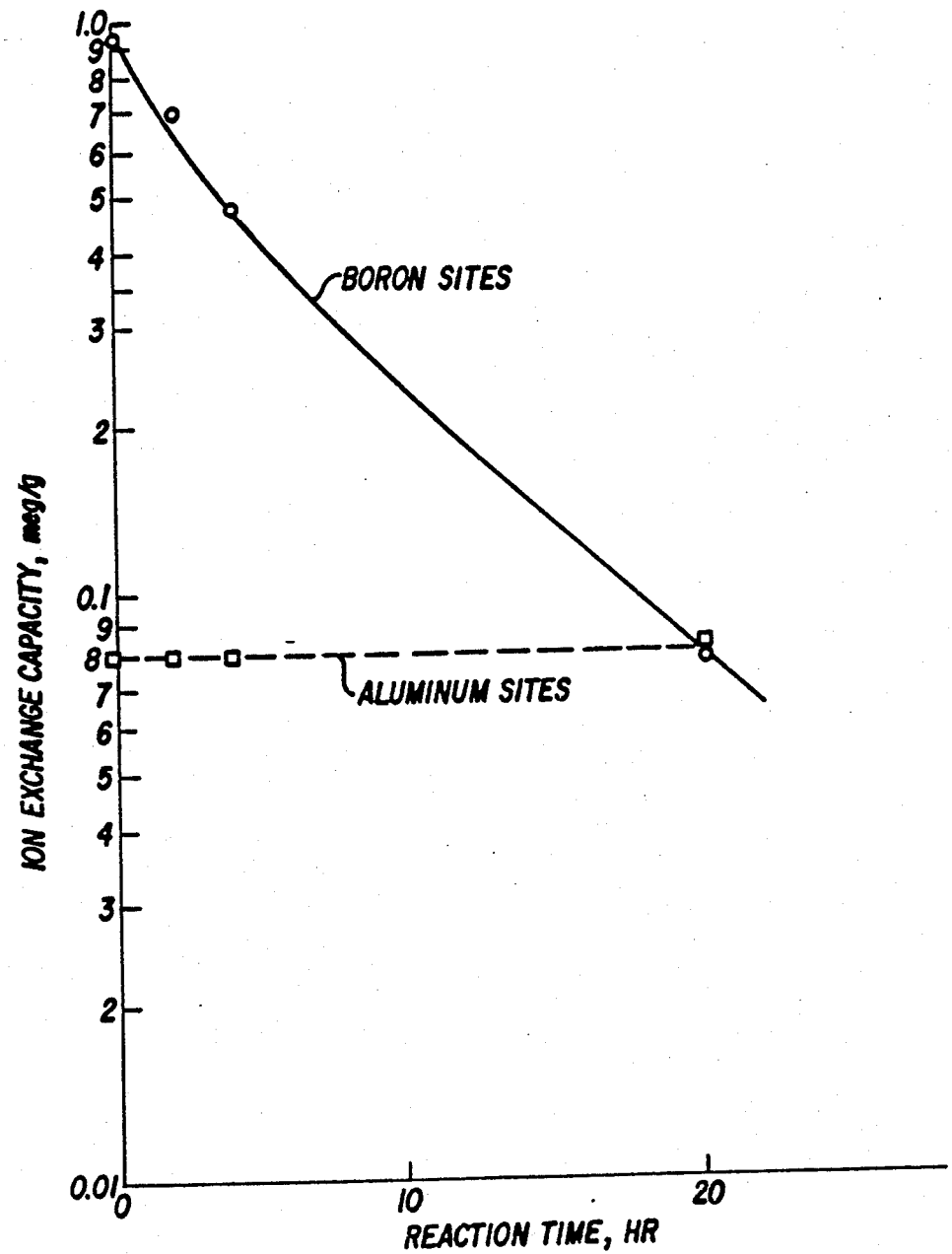
REACTION OF SiCl$_4$ WITH BORON BETA ZEOLITE

DEWAXING BY ISOMERIZATION

CROSS-REFERENCE TO RELATED APPLICATIONS

This application is a continuation-in-part of application Ser. No. 864,746, filed May 13, 1986, now U.S. Pat. No. 4,701,313, which was a continuation of application Ser. No. 683,768, filed Dec. 19, 1984, now abandoned.

BACKGROUND OF THE INVENTION

1. Field of the Invention

This invention relates to a process for dewaxing hydrocarbon feedstocks such as distillate fuel oils and gas oils by isomerizing the waxy components, such as straight and lightly branched chain paraffins, over catalyst comprising a siliceous zeolite having been prepared by the method comprising providing a boron-containing zeolite Beta, treating the zeolite with silicon tetrachloride at a temperature and for a time sufficient to replace boron with silicon, and recovering the siliceous zeolite have reduced boron content but substantially preserved initial aluminum content.

2. Description of the Prior Art

Zeolitic materials, both natural and synthetic, have been demonstrated in the past to have catalytic properties for various types of hydrocarbon conversions. Certain zeolitic materials are ordered, porous crystalline silicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and $AlO_4$ in which the tetrahedra are cross-linked by the sharing of oxygen atoms whereby the ratio of the total non-silicon lattice element, e.g. aluminum, and silicon atoms to oxygen is 1:2. The electrovalence of the tetrahedra containing, for example, aluminum is balanced by the inclusion in the crystal of a cation, for example, an alkali metal or an alkaline earth metal cation. This can be expressed wherein the ratio of the non-silicon lattice element, e.g. aluminum, to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given crystalline silicate by suitable selection of the cation. The spaces between the tetrahedra are occupied by molecules of water prior to dehydration.

Prior art techniques have resulted in the formation of a great variety of synthetic crystalline silicates. These silicates have come to be designated by convenient symbols, as illustrated by zeolite ZSM-5 (U.S. Pat. No. 3,702,886).

The use of certain zeolites as catalyst components is taught in U.S. Pat. No. 4,305,808, for example.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an X-ray diffraction pattern characteristic of ZSM-5. U.S. Pat. Nos. 4,061,724; 4,073,865 and 4,104,294 describe microporous crystalline silicas or organo silicates wherein the aluminum content present is at impurity levels. Zeolite Beta is described in U.S. Pat. No. 3,308,069, the contents of which are entirely incorporated herein by reference.

The use of zeolite Beta catalyst for dewaxing hydrocarbon feedstocks such as distillate fuel oils by isomerization is taught in U.S. Pat. Nos. 4,419,220 and 4,501,926, each incorporated herein by reference in their entirety.

U.S. Pat. No. 4,486,296 teaches hydrodewaxing and hydrocracking of hydrocarbon feedstock over a three-component catalyst including zeolite Beta. Dewaxing paraffin-containing hydrocarbon feedstock involving a hydrotreating step ahead of the dewaxing step over zeolite Beta catalyst is disclosed in U.S. Pat. No. 4,518,485. U.S. Pat. No. 4,481,104 teaches distillate selective hydrocracking using large pore, high silica, low acidity catalyst, e.g. zeolite Beta catalyst. Hydrocracking $C_5+$ naphthas over catalyst comprising zeolite Beta is taught in U.S. Pat. No. 3,923,641. A dewaxing process using a noble metal/zeolite Beta catalyst followed by a base metal/zeolite Beta catalyst is taught in U.S. Pat. No. 4,554,065. U.S. Pat. No. 4,541,919 teaches a dewaxing process using large pore zeolite catalyst such as zeolite Beta which has been coke selectivated; and U.S. Pat. No. 4,435,275 teaches a moderate pressure hydrocracking process which may use catalyst comprising zeolite Beta for producing low pour point distillates.

SUMMARY OF THE INVENTION

The present invention is directed to a process for dewaxing hydrocarbon feedstocks such as distillate fuel oils and gas oils by isomerizing the waxy components, such as straight and slightly branched chain paraffins, over catalyst comprising siliceous zeolite having been prepared by the method comprising providing zeolite Beta containing boron and aluminum, treating the zeolite with silicon tetrachloride at a temperature and for a time sufficient to replace boron with silicon, and recovering the siliceous zeolite having reduced boron content but substantially preserved initial aluminum content.

DESCRIPTION OF DRAWING

The FIGURE presents data of Example 1 showing that treatment of boron-containing zeolite Beta with silicon tetrachloride as required herein reduces boron sites while aluminum sites remain essentially unchanged, each measured by ion exchange capacity.

EMBODIMENTS

The entire contents of application Ser. No. 864,746, now U.S. Pat. No. 4,701,313, are incorporated herein by reference.

The present invention provides for dewaxing distillate feedstocks by isomerizing the waxy paraffins without substantial cracking. The isomerization is carried out over catalyst comprising a specially treated zeolite Beta and may be conducted either in the presence or absence of added hydrogen. The catalyst should include a hydrogenation component such as platinum or palladium in order to promote the reactions which occur. The hydrogenation component may be used in the absence of added hydrogen to promote certain hydrogenation-dehydrogenation reactions which will take place during isomerization.

The hydrogenation component is preferably a noble metal such as platinum, palladium, or another member of the platinum group such as rhodium. Combinations of noble metals such as platinum-rhenium, platinum-palladium, platinum-iridium or platinum-iridium-rhenium together with combinations of non-noble metals, particularly of Groups VIB and VIII of the Periodic Table of Elements are of interest, particularly with metals such as cobalt, nickel, vanadium, tungsten, titanium and molybdenum, and combinations of metals such as platinum-tungsten, platinum-nickel or platinum-nickel-tungsten.

The metal may be incorporated into the catalyst by any suitable method such as impregnation or exchange onto the zeolite. The metal may be incorporated in the form of a cationic, anionic or neutral complex such as $Pt(NH_3)_4^{2+}$ and cationic complexes of this type will be found convenient for exchanging metals onto the zeolite. Anionic complexes such as the vanadate or metatungstate ions are useful for impregnating metals into the zeolites.

The amount of the hydrogenation-dehydrogenation component is suitably from 0.01 to 10 percent by weight, normally 0.1 to 5 percent by weight, although this will, of course, vary with the nature of the component, less of the highly active noble metals, particularly platinum, being required than of the less active base metals.

Base metal hydrogenation components such as cobalt, nickel, molybdenum and tungsten may be subjected to a pre-sulfiding treatment with a sulfur-containing gas such as hydrogen sulfide in order to convert the oxide forms of the metal to the corresponding sulfides.

In general, conversion conditions for the present process include a temperature of from about 200° C. to about 500° C., preferably from about 400° C. to about 450° C., a pressure of from about 100 kPa to about 25,000 kPa, preferably from about 100 kPa to about 15,000 kPa, a liquid hourly space velocity of from about 0.1 hr$^{-1}$ to about 20 hr$^{-1}$, preferably from about 0.1 hr1 to about 10 hr1, and a hydrogren/feedstock hydrocarbon compound mole ratio of from 0 (no added hydrogen) to about 100.

For the catalyst of this invention, zeolite crystallization is performed by the proper choice of aluminum and another species acceptable to the zeolite framework so that the product contains the desired ultimate amount of aluminum and excess of the other species to facilitate the desired synthesis. The concentration of the other species is conventional and determinable by those skilled in the art. Preferably, the other species will comprise boron. Of course, other such species, having characteristics substantially the same as or equivalent to boron, can be used. The product is subsequently exposed to a flowing gas stream containing silicon tetrachloride at a temperature and for a time of exposure selected to extract substantially all of the other species. However, temperature and time are selected to substantially avoid extraction of aluminum from the lattice of the zeolite, and may be within the ranges of from about room temperature to about 400° C., for a time of from about 0.5 hour to about 48 hours. Thus, selection of the final aluminum content is accomplished by controlling the aluminum/other species ratio during synthesis and choosing conditions for the silicon substitution which will selectively convert the other species.

The temperature at which the removal of the other species will occur within the above range is determinable by a person skilled in this art.

Concerning the other species, the species is to be selected according to the teachings of this invention so that it permits extraction of substantially all, if not all, under certain temperature and time conditions, while substantially avoiding extraction of aluminum from the lattice of the zeolite. Such other species are known to those skilled in the art or can be selected by those skilled in the art without undue experimentation. As mentioned above, boron is the preferred other species.

The structure of the zeolite for use as catalyst in this invention is that to zeolite Beta. The zeolite Beta, following treatment as required herein, will preferably have a composition comprising silica and alumina tetrahedra such that its silica/alumina mole ratio will be greater than 100/1.

According to another embodiment of the invention, it relates to a zeolite having an intrinsically high aluminum concentration as synthesized. The aluminosilicate zeolite is converted into a form comprising at least two cationic constituents in selected ratio. The resulting zeolite is such that one of the cationic constituents, which is relatively easily converted by subsequent silicon treatment, exists in the concentration corresponding to the ultimately desired aluminum concentration to be attained on the zeolite. For example, the aluminosilicate synthesized is subjected to a base exchange solution containing sodium and ammonium ion so that subsequent drying and calcining will produce a mixture of the protonic and the sodium forms. The silicon halide treatment is then chosen under conditions of severity, such that the protonated aluminum will readily react, that is, the following reaction:

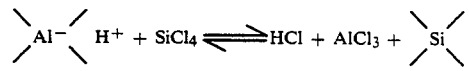

will take place, subsituting a silicon atom at the site. The acid and aluminum chloride are volatilized. Again, silicon tetrachloride is the preferred silicon substitution agent. The preceding illustration is merely illustrative and not limiting.

This procedure may be used based on the pair of cations being ammonium and alkali metal ion, and other pairs that may prove to be sufficiently different in reactivity with the silicon substitution agent. In all cases, the silicon substitution treatment is chosen in conditions of temperature and time to provide adequate protection of the aluminum framework species that is not to be extracted. The conditions mentioned in the preceding treatment occurring during crystallization can be utilized here. The selection of the source of the sodium and ammonium ion is readily made by those skilled in the art. The drying and calcining procedures are conventional and known to those skilled in the art.

Thus, the catalyst treatment is characterized by a step of selecting an amount of aluminum to be retained in a product by use of a silicon substitution treatment which will substantially preserve the selected amount of aluminum framework species.

Without wishing to be bound by any particular theory of operability, it is believed that the silicon component of the silicon halide is deposited at the site previously occupied by the more reactive component to the silicon halide. Thus, it is considered that this method leads to even greater stabilization, because the vacancy left by this component is "filled" with another atom or molecule. However, the healing mechanism is not really known. Furthermore, this method can be used to introduce different atoms into the aluminosilicate structure, thus modifying catalytic function.

The improved characteristics of zeolite Beta treated in this fashion render it particularly attractive for application in the present process.

The zeolite Beta treated as above can be in a wide variety of particle sizes. Generally speaking, the particles can be in the form of a powder, a granule, or a molded product, such as a extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In practicing the desired chemical conversion process, it may be useful to composite the treated zeolite Beta with matrix-comprising material resistant to the temperature and other conditions employed in the process. Such matrix material is useful as a binder and imparts additional resistance to the catalyst for the temperature, pressure and reactant feed stream velocity conditions allowed in the present process. The composite may be in the form of an extrudate.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or other in which the main mineral constituent is halloysite, kaolinite, dickite, nacrite and anauxite. Such clays can be used in the raw state as originally mined or initially subjected to clacination, acid treatment or chemical modification.

In addition to the foregoing matrix materials, the catalyst employed herein may be composited with a porous matrix material such as alumina, silica, silica-alumina, silica-magnesia, silica-zirconia, silica-thoria, silica-beryllia, and silica-titania, as well as ternary compositions, such as silica-alumina-thoria, silica-alumina-zirconia, slica-alumina-magnesia and silica-magnesia-zirconia. The matrix may be in the form of a cogel. The relative proportions of activity enhanced zeolite component and matrix, on an anhydrous basis, may vary widely with the zeolite content of the dry composite ranging from about 1 to about 99 percent by weight and more usually in the range of about 5 to about 80 percent by weight.

The present process may be used to dewax a variety of feedstocks ranging from relatively light distillate fractions up to high boiling stocks such as whole crude petroleum, reduced crudes, vacuum tower residua, cycle oils, FCC tower bottoms, gas oils, vacuum gas oils, deasphalted residua and other heavy oils. The feedstock will normally be a $C_{10}{}^+$ feedstock since lighter oils will usually be free of significant quantities of waxy components. However, the process is particularly useful with waxy distillate stocks such as gas oils, kerosenes, jet fuels, lubricating oil stocks, heating oils and other distillate fractions whose pour point and viscosity need to be maintained within certain specification limits. Lubricating oil stocks will generally boil above 230° C., more usually above 315° C. Hydrocracked stocks are a convenient source of stocks of this kind and also of other distillate fractions since they normally contain significant amounts of waxy n-paraffins which have been produced by the removal of polycyclic aromatics.

The feedstock for the present process will normally be a $C_{10}{}^+$ feedstock containing paraffins, olefins, naphthenes, aromatics and heterocyclic compounds and with a substantial proportion of higher molecular weight n-paraffins and slightly branched paraffins which contribute to the waxy nature of the feedstock.

In this process, feedstock n-paraffins become isomerized to iso-paraffins and the slightly branched paraffins undergo isomerization to more highly branched aliphatics. At the same time, a measure of cracking does take place so that not only is the pour point reduced by reason of the isomerization of n-paraffins to the less waxy branched chain iso-paraffins but, in addition, the heavy ends undergo some cracking or hydrocracking to form liquid range materials which contribute to a low viscosity product. The degree of cracking which occurs is, however, limited so that the gas yield is reduced, thereby preserving the economic value of the feedstock.

Typical feedstocks include light gas oils, heavy gas oils and reduced crudes boiling above 150° C.

It is a particular advantage of the present process that the isomerization proceeds readily, even in the presence of significant proportions of aromatics in the feedstock and for this reason, feedstocks containing aromatics, e.g. 10 percent or more aromatics, may be successfully dewaxed. The aromatic content of the feedstock will depend, of course, upon the nature of the crude employed and upon any preceding processing steps such as hydrocracking which may have acted to alter the original proportion of aromatics in the oil. The aromatic content will normally not exceed 50 percent by weight of the feedstock and more usually will be not more than 10 to 30 percent by weight, with the remainder consisting of paraffins, olefins, naphthenes and heterocyclics. The paraffins content (normal and iso-paraffins) will generally be at least 20 percent by weight, more usually at least 50 or 60 percent by weight. Certain feedstocks such as jet fuel stocks may contain as little as 5 percent paraffins.

The present process may be conducted with the catalyst in a stationary bed, a fixed fluidized bed or with a transport bed, as desired. A simple and therefore preferred configuration is a trickle-bed operation in which the feed is allowed to trickle through a stationary fixed bed, preferably in the presence of hydrogen. With such configuration it is of considerable importance in order to obtain maximum benefits from this invention to initiate the reaction with fresh catalyst at a relatively low temperature such as 300° C. to 350° C. This temperature is, of course, raised as the catalyst ages, in order to maintain catalytic activity. In general, for lube oil base stocks the run is terminated at an end-of-run temperature of about 450° C., at which time the catalyst may be regenerated by contact at elevated temperature with hydrogen gas, for example, or by burning in air or other oxygen-containing gas.

The present process proceeds mainly by isomerization of the n-paraffins to form branched chain products, with but a minor amount of cracking and the products will contain only a relatively small proportion of gas and light ends up to $C_5$. Because of this, there is less need for removing the light ends which could have an adverse effect on the flash and fire points of the products, as compared to processes using other catalysts. However, since some of these volatile materials will usually be present from cracking reactions, they may be removed by distillation.

The selectivity of the catalyst for isomerization is less marked with the heavier oils. With feedstocks containing a relatively higher proportion of the higher boiling materials relatively more cracking will take place and it may therefore be desirable to vary the reaction conditions accordingly, depending both upon the paraffinic content of the feedstock and upon its boiling range, in order to maximize isomerization relative to other and less desired reactions.

A preliminary hydrotreating step to remove nitrogen and sulfur and to saturate aromatics to naphthenes without substantial boiling range conversion will usually improve catalyst performance and permit lower temperatures, higher space velocities, lower pressures or combinations of these conditions to be employed. Said hydrotreating comprises contacting the oil in a hydrotreating zone containing a Co-Mo or Ni-Mo on alumina catalyst operated at hydrotreating conditions including a temperature of 250° C. to 400° C., a hydrogen partial pressure of atmospheric to 15,000 kPa, and a liquid hourly space velocity of 0.1 to 10, to remove at least a portion of said sulfur and nitrogen compounds.

In order to more fully illustrate the nature of the invention and the manner of practicing same, the following examples are presented.

EXAMPLE 1

Zeolite Beta was obtained containing boron and aluminum as shown in the Figure. The boron and aluminum contents are depicted in the Figure by ion exchange capacity in meq/g. The zeolite exhibited over 0.9 meq/g ion exchange capacity attributable to boron sites, and 0.08 meq/g ion exchange capacity attributable to aluminum sites. The zeolite Beta was contacted with silicon tetrachloride vapor at mild conditions, including atmospheric pressure and 315° C. for a total of about 20 hours. Periodically during the contacting period, the zeolite Beta was analyzed for remaining boron and aluminum sites by measuring its ion exchange capacity. The data generated is presented in the FIGURE, showing that the ion exchange capacity for the aluminum sites remained essentially constant, indicating no removal of aluminum sites from the zeolite Beta framework. The data also showed that the ion exchange capacity for the boron sites decreased steadily and significantly while the aluminum sites remained constant. After about 20 hours reaction time, the zeolite still exhibited about 0.8 meq/g ion exchange capacity attributable to the aluminum sites. This corresponds to a silica/alumina mole ratio of about 280.

The silicon tetrachloride treated zeolite is then exchanged to the ammonium form by refluxing with 1N ammonium chloride solution at 90° C. for 1 hour. The ammonium exchange is followed by refluxing the zeolite with 1N magnesium chloride at 90° C. for 1 hour. Platinum is introduced into the zeolite by ion-exchange of the tetrammine complex at room temperature. The Pt-exchanged zeolite is thoroughly washed, dried and air calcined at 55° C. The finished catalyst containing 0.8 wt % Pt is pelleted, crushed and sized to 30–40 mesh (Tyler) for catalytic evaluation.

EXAMPLES 2 and 3

Two cc of the metal exchanged zeolite Beta catalyst are mixed with 2 cc of 30–40 (Tyler) mesh acid washed quartz chips ("Vycor"-trademark) and then loaded into a 10 mm ID stainless steel reactor. The catalyst is reduced in hydrogen at 450° C. for an hour at atmospheric pressure. Prior to the introduction of the liquid feed, the reactor is pressurized with hydrogen to the desired pressure, i.e., 400 psig for Example 2 and 1000 psig for Example 3.

The liquid feed used is a 850°–1000° F. paraffinic gas oil having the following properties:

TABLE 1

| API Gravity | 33.0 |
|---|---|
| Hydrogen, wt. % | 13.6 |
| Sulfur, wt. % | 0.07 |
| Nitrogen, ppm | 320 |
| Basic Nitrogen, ppm | 160 |
| CCR | 0.04 |
| Composition, wt. % | |
| Paraffin | 60 |
| Naphthene | 23 |
| Aromatics | 17 |
| Bromine No. | 0.8 |
| KV @ 100° C., cs | 4.18 |
| Pour Point, °F. | 115 |

The gas oil is dewaxed under the conditions shown in Table 2 to give the products shown in the table. The liquid and gas products are collected at room temperature and atmospheric pressure and the combined gas and liquid recovery give a material balance of over 95%.

TABLE 2

| Isomerization Dewaxing of Gas Oil | | | |
|---|---|---|---|
| | | Example | |
| | Feed | 2 | 3 |
| Pressure, psig | — | 400 | 1000 |
| Temperature, °F. | — | 840 | 815 |
| LHSV | — | 1 | 1 |
| H$_2$ Circulation, SCF/B | — | 2500 | 2500 |
| Product Yield, wt. % | | | |
| C$_1$–C$_4$ | — | 3 | 2 |
| C$_5$–330° F. | — | 12 | 9 |
| 330° F.+ | 100 | 85 | 89 |
| 330° F.+ Pour Point, °F. | 115 | 15 | 15 |
| Hydrogen Consumption, SCF/B | 300 | 400 | |
| Cetane Index, 330–850° F. | — | 67 | 77 |

The results in Table 2 show that for Example 2, 15% of this waxy gas oil (115° F. pour point) is converted to gasoline (12 wt. %) and lighter products (3 wt. % C$_4$−) while producing 85% yield of 15° F. pour distillate. The results show that for Example 3 at 1000 psig hydrogen pressure, 11% of the gas oil feed is converted to gasoline (9 wt. %) and lighter products (2 wt. %) while producing 89% yield of 15° F. pour distillate.

EXAMPLE 4

The feed of Examples 2 and 3 is passed through a cascade hydrotreating/dewaxing reactor scheme (without interstage separation of NH$_3$ and H$_2$S) at 1000 psig.

The hydrotreating stage catalyst is Co-Mo/alumina and the dewaxing stage catalyst is the Pt-exchanged zeolite Beta of Example 1. Process conditions and results are shown in Table 3.

TABLE 3

| Cascade Hydrotreating - Isomerization Dewaxing of Gas Oil | | |
| --- | --- | --- |
| | Feed | Example 4 |
| Pressure, psig | — | 1000 |
| Temperature, °F. | | |
| Hydrotreating | — | 770 |
| Dewaxing | — | 750 |
| LHSV, hr.$^{-1}$ | — | 1 |
| $H_2$ Circulation, SCF/B | — | 4500 |
| Product Yield, wt. % | | |
| $C_1$-$C_4$ | — | 1 |
| $C_5$-330° F. | — | 4 |
| 330° F.+ | 100 | 95 |
| 330° F.+ Pour Point, °F. | 115 | −5 |
| $H_2$ Consumption, SCF/B | — | 650 |

It is observed from these results that hydrotreating the feedstock significantly reduces the severity of the isomerization dewaxing operation (e.g. operating temperature reduced to 750° F.) and further improves the 330° F.+ distillate yield to 95% at a lower product pour point of −5° F. with 650 SCF/B hydrogen consumption. It is believed that the hydrotreating/isomerization dewaxing cascade operation with interstage $NH_3$ and $H_2S$ separation will further reduce dewaxing severity and improve product yield and quality.

Although the invention has been described in conjunction with specific embodiments, it is evident that alternatives and variations will be apparent to those skilled in the art in light of the foregoing description. Accordingly, the invention is intended to embrace all of the alternatives and variations that fall within the spirit and scope of the appended claims.

What is claimed is:

1. A process for dewaxing a hydrocarbon feedstock containing paraffins which comprises contacting the feedstock under isomerization conditions with a catalyst comprising a hydrogenation component and siliceous zeolite having been prepared by a method comprising providing a boron-containing zeolite Beta with initial boron and aluminum contents each greater than the numeral 0, treating the zeolite with silicon tetrachloride at a temperature and for a time sufficient to replace boron with silicon, and recovering the siliceous zeolite having reduced boron content but substantially preserved initial aluminum content.

2. The process of claim 1 in which the feedstock includes aromatic components in addition to the paraffins.

3. The process of claim 2 in which the proportion of aromatic components is from 10 to 50 wt. % of the feedstock.

4. The process of claim 1 in which the hdyrogenation component comprises a noble metal of Group VIII of the Periodic Table.

5. The process of claim 4 in which the hydrogenation component comprises platinum.

6. The process of claim 1 in which the feedstock is contacted with the catalyst in the absence of added hydrogen.

7. the process of claim 1 wherein said isomerization conditions include a temperature of from about 200° C. to about 500° C., a pressure of from about 100 kPa to about 25,000 kPa, a liquid hourly space velocity of from about 0.1 hr$^{-1}$ to about 20 hr$^{-1}$ and a hydrogen/hydrocarbon mole ratio of from 0 to about 100.

8. The process of claim 7 wherein said temperature is from about 400° C. to about 450° C., said pressure is from about 100kPa to about 15,000 kPa and said space velocity is from about 0.1 hr$^{-1}$ to about 10 hr$^{-1}$.

9. The process of claim 1 wherein said catalyst composition comprises said siliceous zeolite and a matrix.

10. The process of claim 9 wherein said matrix is alumina-containing material.

11. The process of claim 9 wherein said catalyst composition is in the form of an extrudate.

12. The process of claim 9 wherein said catalyst composition is in the form of beads.

13. The process of claim 1 wherein said feedstock has been hydrotreated.

14. The process of claim 7 wherein said feedstock has been hydrotreated at a tempeature of from about 250° C. to about 400° C., a pressure of from atmospheric to about 15,000 kPa and a liquid hourly space velocity of from about 0.1 hr$^{-1}$ to about 10 hr$^{-1}$.

* * * * *

UNITED STATES PATENT AND TRADEMARK OFFICE
CERTIFICATE OF CORRECTION

PATENT NO. : 4,788,378

DATED : November 29, 1988

INVENTOR(S) : C.D. Chang et al

It is certified that error appears in the above-identified patent and that said Letters Patent is hereby corrected as shown below:

Col. 5, line 49, "clacination" should be --calcination--
Col. 5, line 56, "slica-alumina-magnesia-" should be --silica-alumina-magnesia--
Col. 8, line 4, "55°C" should be --550°C--
Col. 8, line 14, "th e" should be --the--
Col. 8, Table 2, line 53, "300" and "400" should be under column headed "Example 2   3 " respectively
Col. 10, Claim 14, line 41, "tempeature" should be --temperature--

Signed and Sealed this

Twenty-fifth Day of April, 1989

Attest:

DONALD J. QUIGG

*Attesting Officer*   Commissioner of Patents and Trademarks